US007356672B2

(12) United States Patent
Vahid et al.

(10) Patent No.: US 7,356,672 B2
(45) Date of Patent: Apr. 8, 2008

(54) WARP PROCESSOR FOR DYNAMIC HARDWARE/SOFTWARE PARTITIONING

(75) Inventors: Frank Vahid, Corona, CA (US); Roman Lev Lysecky, Hemet, CA (US); Gregory Michael Stitt, San Bernardino, CA (US)

(73) Assignee: The Regents of the University of California, Oakland, CA (US)

( * ) Notice: Subject to any disclaimer, the term of this patent is extended or adjusted under 35 U.S.C. 154(b) by 295 days.

(21) Appl. No.: 10/856,062

(22) Filed: May 28, 2004

(65) Prior Publication Data

US 2005/0278714 A1 Dec. 15, 2005

(51) Int. Cl.
*G06F 15/76* (2006.01)
*G06F 9/44* (2006.01)

(52) U.S. Cl. ......................................... 712/37; 717/159
(58) Field of Classification Search ................... 712/37; 717/159
See application file for complete search history.

(56) References Cited

U.S. PATENT DOCUMENTS

| | | | |
|---|---|---|---|
| 5,815,715 A * | 9/1998 | Kuçukçakar | 717/141 |
| 5,870,588 A | 2/1999 | Rompaey et al. | |
| 6,226,776 B1 | 5/2001 | Panchul et al. | |
| 6,415,384 B1 | 7/2002 | Dave | |
| 6,507,947 B1 | 1/2003 | Schreiber et al. | |
| 6,622,287 B1 | 9/2003 | Henkel | |
| 6,871,341 B1 * | 3/2005 | Shyr | 717/131 |
| 7,007,264 B1 * | 2/2006 | Baxter | 716/18 |

OTHER PUBLICATIONS

"Binary-Level Hardware/Software Partitioning of MediaBench, NetBench, and EEMBC Benchmarks"; Stitt et al.; Jan. 2003.*
"Advanced Digital Design with the Verilog HDL"; Michael Ciletti; 2003.*
Bala, V., et al., "Dynamo: A Transparent Dynamic Optimization System" Proc. Of the ACM SIGPLAN '00 Conference on Programming Language Design and Implementation, pp. 1-12, 2000.
Cifuentes, C., et al., "Structuring Decompiled Graphs", Proc. of the International Conference on Compiler Construction, Lecture Notes in Computer Science, vol. 1060, Linkoping, Sweden, p. 91-105, Apr. 1996.
Cifuentes, C., et al., "Assembly to High-Level Language Translation" Department of Computer Science and Electrical Engineering, University of Queensland, Technical Report 439, Aug. 1998.
Cifuentes, C., et al., "Preliminary Experiences with the Use of the UQBT Binary Translation Framework" Proc. of the Workshop on Binary Translation, Newport Beach, USA, Oct. 1999.

(Continued)

*Primary Examiner*—Alford Kindred
*Assistant Examiner*—Benjamin P. Geib
(74) *Attorney, Agent, or Firm*—Gates & Cooper LLP

(57) ABSTRACT

A warp processor includes a microprocessor, profiler, dynamic partitioning module, and warp configurable logic architecture. The warp processor initially executes a binary for an application entirely on the microprocessor, the profiler monitors the execution of the binary to detect its critical code regions, and the dynamic partitioning module partitions the binary into critical and non-critical code regions, re-implements the critical code regions in the configurable logic, and then transforms the binary so that it accesses the configurable logic rather than execute the critical code regions.

30 Claims, 8 Drawing Sheets

OTHER PUBLICATIONS

Goering, R., "C design goes 'soft'."EE Times http://www.eetimes.com/article/printableArticle.jhtml?articleID=17407248&url_prefix=story&sub_taxonomyID=2251, Apr. 23, 2001.

Gschwind, M., et al., "Dynamic and Transparent Binary Translation," IEEE Computer Magazine vol. 33, No. 3, pp. 54-59, Mar. 2000.

Hounsell, B., et al., "Co-processor Synthesis: A New Methodology for Embedded Software Acceleration" Proc. of the Design, Automation and Test in Europe Conference and Exhibition, IEEE Feb. 2004.

Klaiber, "The Technology Behind Crusoe Processors" Alexander Klaiber Transmeta Corporation, pp. 1-18, Jan. 2000.

Lysecky, R., et al., "On-Chip Logic Minimization" IEEE/ACM 40$^{th}$ Design Automation Conference (DAC), pp. 250-255, Jun. 2003.

Lysecky, R. et al., "A Codesigned On-Chip Logic Minimizer," ACM/IEEE ISSS/CODES conference (DAC), pp. 109-113, Oct. 2003.

Lysecky, R., "A Configurable Logic Architecture for Dynamic Hardware/Software Partitioning.," IEEE/ACM Design Automation Test in Europe Conference, 480-485, Feb. 2004.

Lysecky, R., "Dynamic FPGA Routing for Just-in-Time FPGA Compilation" Design Automation Test in Europe Conference, Jun. 2004.

Smit, G., et al., "Dynamic Reconfiguration in Mobile Systems," 12$^{th}$ International Conference on Field Programmable Logic and Application Montpellier, Sep. 2002.

Stitt, G., et al., "Dynamic Hardware/Software Partitioning: A Fist Approach," ACM Design Automation Conference (DAC), Jun. 2003.

Stitt, G., et al., "Energy Advantages of Microprocessor Platforms with On-Chip Configurable Logic", IEEE Design and Test of Computers, pp. 36-43, Nov./Dec. 2002.

Stitt, G., et al., "Hardware/Software Partitioning of Software Binaries," IEEE/ACM International Conference on Computer Aided Design, pp. 164-170, Nov. 2002.

Stitt, G., et al., "On-Chip Configurable Logic to Reduce Embedded System Software Energy," IEEE Symposium on Field-Programmable Custom Computing Machines, Napa Valley, pp. 143-151, Apr. 2002.

Vahid, F., et al., "Highly Configurable Platforms for Embedded Computing Systems," Microelectronics Journal, Elsevier Publishers, vol. 34, Issue 11, pp. 1025-1029, Nov. 2003.

Zhang, C., et al., "A Self-Tuning Cache Architecture for Embedded Systems," Design Automation and Test in Europe Conference (DATE), pp. 142-147, Feb. 2004.

Zhang, C., et al., "A Way-Halting Cache for Low-Energy High-Performance Systems," IEEE Computer Architecture Letters, vol. 2, Sep. 2003.

Zhang, C., "A Highly-Configurable Architecture for Embedded Systems" International Symposium on Computer Architecture, pp. 136-146, 2003.

* cited by examiner

WARP PROCESSOR FOR DYNAMIC HARDWARE/SOFTWARE PARTITIONING

STATEMENT REGARDING FEDERALLY-SPONSORED RESEARCH OR DEVELOPMENT

This invention was made with Government support under Grant Nos. CCR-9876006 & CCR-0203829, awarded by the National Science Foundation. The Government has certain rights in this invention.

BACKGROUND OF THE INVENTION

1. Field of the Invention

The present invention relates to reconfigurable hardware logic, and particularly to a warp processor for dynamic hardware/software partitioning.

2. Description of the Related Art

Previously, designers have utilized dynamic optimizations to improve software performance. Such approaches are especially effective because they are transparent, requiring no extra designer effort or special tools. However, since the optimizations are restricted to software, improvements are limited.

DYNAMO is one such dynamic binary optimizer developed by HEWLETT PACKARD, and BOA is a similar optimizer by IBM for the POWERPC. Related efforts include the CRUSOE and EFFICEON processors by TRANSMETA, which are very long instruction word (VLIW) processors that dynamically translate x86 instructions into VLIW instructions.

Run-time reconfigurable systems achieve better speedups than dynamic software optimization, but require hardware regions to be pre-determined statically with designer effort.

DISC is an example of a run-time reconfigurable system that dynamically swaps in hardware regions into a Field Programmable Gate Array (FPGA) when needed during software execution. CHIMAERA is a similar approach that treats the configurable logic as a cache of reconfigurable functional units.

Other examples of run-time reconfigurable systems include a Dynamically Programmable Gate Array (DPGA) used to rapidly reconfigure the system to perform one of several pre-programmed configurations.

Hardware/software partitioning is the process of dividing an application into software running on a microprocessor and hardware co-processors. Partitioning is a well-known technique that can achieve results superior to software-only solutions. Partitioning can improve performance and even reduce energy consumption. For example, the appearance of single-chip platforms incorporating a microprocessor and FPGA on a single chip have recently made hardware/software partitioning even more attractive.

Such platforms yield more efficient communication between the microprocessor and FPGA than multi-chip platforms, resulting in improved performance and reduced power. In fact, such single-chip platforms encourage partitioning by designers who might have otherwise created a software-only design. By treating the FPGA as an extension of the microprocessor, a designer can move code regions from the software executed by the microprocessor onto the FPGA, resulting in improved performance and usually reduced energy consumption.

However, hardware/software partitioning has had limited commercial success due in part to tool flow problems. First, a designer must use an appropriate profiler to detect code regions that contribute to a large percentage of the execution time in the software. Second, a designer must use a compiler with partitioning capabilities to partition the software; however, such compilers are rare and often resisted because companies may have trusted compilers. Third, the designer must apply a synthesis tool to convert the partitioning compiler's hardware description output to a configuration for the FPGA.

A tool flow requiring integration of profilers, special compilers, and synthesis is far more complicated than that of typical software design, requiring extra designer effort that most designers and companies are not willing to carry out. Thus, the more transparent one can make hardware/software partitioning, the more successful hardware/software partitioning may be.

Binary-level hardware/software partitioning approaches are more transparent as compared to traditional source-level partitioning methods. Binary partitioning has the advantages of working with any software compiler and any high-level language. In addition, binary partitioning considers assembly code and object code as hardware candidates. Software estimation is also more accurate in a binary-level approach. Previous work has shown that binary partitioning achieves similar speedups to source-level partitioning for numerous benchmarks.

Thus, there is a need in the art for automatic and transparent hardware/software partitioning. There is further a need in the art for automatic compilation of implementations or configurations for configurable logic. The present invention meets these needs.

SUMMARY OF THE INVENTION

To minimize the limitations in the related art described above, and to minimize other limitations that will become apparent upon reading and understanding the present specification, the present invention discloses a warp processor that includes a microprocessor, profiler, dynamic partitioning module, and warp configurable logic architecture. The warp processor initially executes a binary for an application entirely on the microprocessor, the profiler monitors the execution of the binary to detect its critical code regions, and the dynamic partitioning module partitions the binary into critical and non-critical code regions, re-implements the critical code regions in the configurable logic, and then transforms the binary so that it accesses the configurable logic rather than execute the critical code regions.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
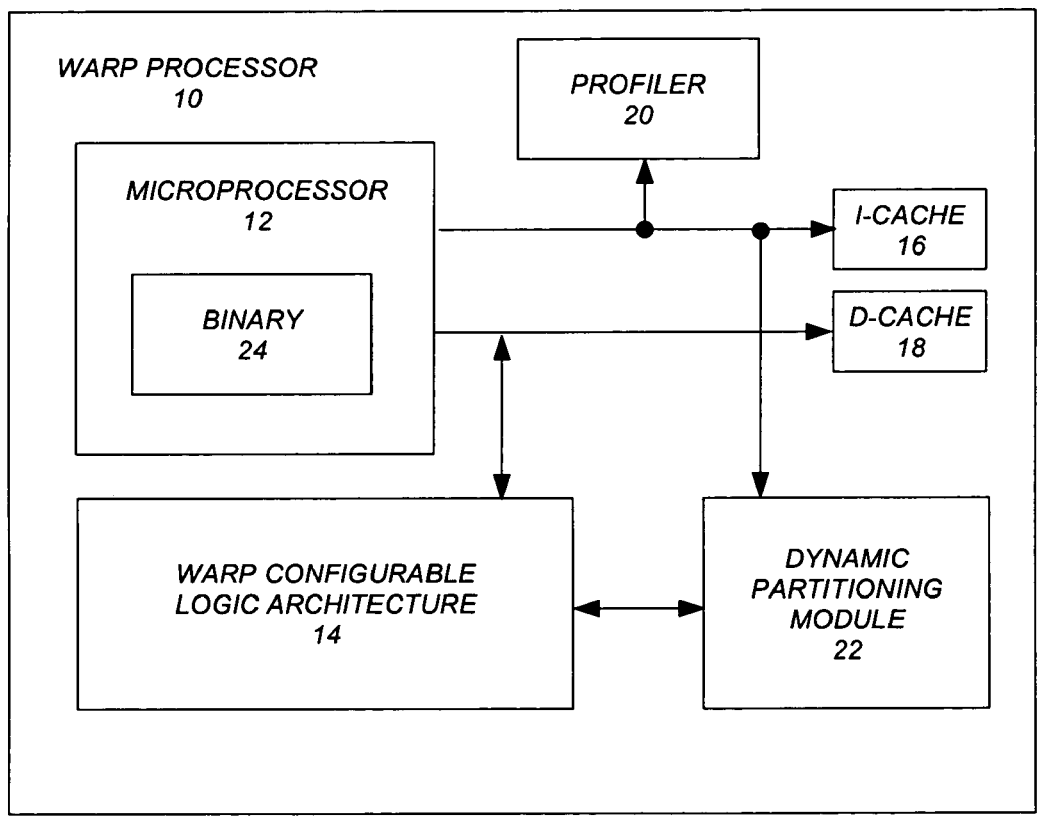
FIG. 1 is a block diagram that illustrates a warp processor according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes a warp processor that provides for dynamic hardware/software partitioning. Specifically, the invention performs dynamic and transparent partitioning of an executing software application's critical code regions and re-implements those critical code regions in one or more dynamically configurable logic devices.

Internally, a warp processor is comprised of a microprocessor, an efficient profiler, a dynamic partitioning module, and a warp configurable logic architecture (WCLA), including such dynamically configurable logic devices as field programmable gate arrays (FPGA), dynamically programmable gate arrays (DPGA), or other configurable logic. The warp processor initially executes a binary for the software application entirely on the microprocessor, the profiler monitors the execution of the binary to detect its critical code regions, and the dynamic partitioning module automatically and transparently partitions the binary into critical and non-critical code regions, re-implements the critical code regions (or possibly all of the code regions) in the configurable logic, and then transforms the binary so that it accesses the configurable logic rather then execute the critical code regions. Since the configurable logic typically executes much faster than a microprocessor, the combination of the microprocessor executing the transformed binary and the configurable logic performing the critical code regions results in a system that is faster than the microprocessor itself and consumes less energy, without requiring special compilers or designer effort.

The warp processor can also be used to perform Just-in-Time (JIT) compilation for any of a plurality of different warp configurable logic architectures. Specifically, the binary for an application could be downloaded into different warp processors, wherein each of the warp processors is comprised of different components, such as different warp configurable logic architectures. Consequently, on each of the different warp processors, different critical code regions (or possibly all of the code regions) of the binary may be re-implemented in different configurable logic. Thus, at run time, the JIT compilation determines the best implementation of the binary onto the particular warp configurable logic architecture of the specific warp processor. Such an approach provides hardware portability, thereby increasing the usefulness and desire of incorporating warp configurable logic architecture into consumer products.

The warp processor opens up a new market segment for hardware/software partitioning, which provides embedded systems designers with potential great improvements in performance and energy consumption. By providing a transparent and dynamic hardware/software partitioning approach, designers using a warp processor are able to benefit from the potential improvements provided by traditional partitioning approaches without requiring any special design effort or hardware expertise.

Additionally, the JIT compilation enables designers to create a single binary for a given application and yet implement that binary onto any number of different warp configurable logic architectures, thereby providing designers with flexibility in choosing a warp configurable logic architecture that best meets the designers' needs without requiring a custom implementation for each warp configurable logic architecture a designer might consider. Additionally, designers can more readily incorporate a warp configurable logic architecture into their products, while still allowing consumers to receive binary updates (similar to firmware updates) that may include more advanced logic to provide consumers with additionally functionality.

Implementation

FIG. 1 is a block diagram that illustrates a warp processor 10 according to the preferred embodiment of the present invention. The warp processor 10 includes a microprocessor 12, a warp configurable logic architecture (WCLA) 14, instruction cache 16, data cache 18, profiler 20 and dynamic partitioning module (DPM) 22. Initially, a binary 24 of an application is executed using the microprocessor 12. During execution of the binary 24, the profiler 20 non-intrusively monitors the execution of the binary in the microprocessor 12 to determine relative execution frequencies of various code regions of the binary 24, in order to identify critical and non-critical code regions. After identifying these critical and non-critical code regions, the dynamic partitioning module 22 performs dynamic hardware/software partitioning between the critical and non-critical code regions, and re-implements the critical code regions in the warp configurable logic architecture 14. The dynamic partitioning module 22 then updates the binary to access or invoke the warp configurable logic architecture 14 instead of the critical code regions.

Figure 2:
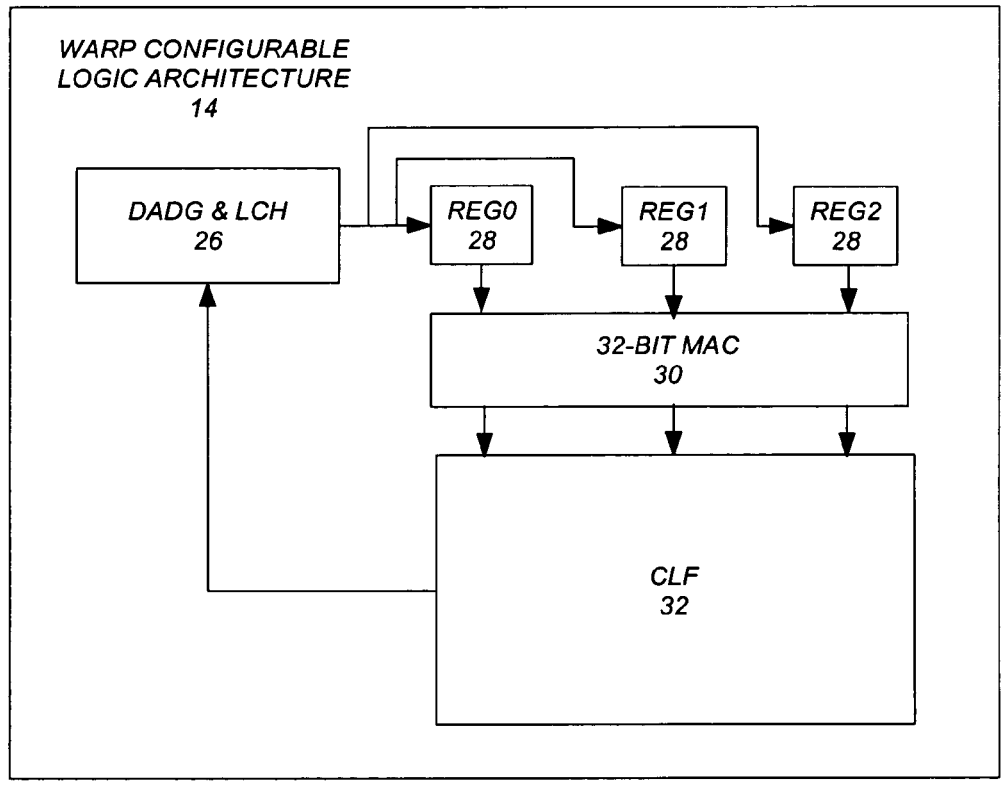
FIG. 2 is a block diagram that illustrates one possible embodiment for the warp configurable logic architecture according to the preferred embodiment of the present invention.

FIG. 2 is a block diagram that illustrates one possible embodiment for the warp configurable logic architecture 14 according to the preferred embodiment of the present invention. The warp configurable logic architecture 14 may include a data address generator (DADG) with loop control hardware (LCH) 26, a plurality of input and output registers (REG0, REG 1 and REG2) 28, a 32-bit multiplier-accumulator (MAC) 30, and a configurable logic fabric (CLF) 32. The WCLA 14 handles all memory accesses to and from the CLF 32 using the DADG 26, which is capable of generating addresses for up to three distinct arrays. Furthermore, the data retrieved and stored to and from each array is located within one of the three registers REG0, REG 1 and REG2 28. These three registers REG0, REG 1 and REG2 28 also act as the inputs to the CLF 32 and can be mapped as inputs to the 32-bit MAC 30 or directly mapped to the CLF 32. Finally, the outputs from the CLF 32 are connected as inputs to the three registers REG0, REG 1 and REG2 28 using a dedicated bus.

Figure 3:
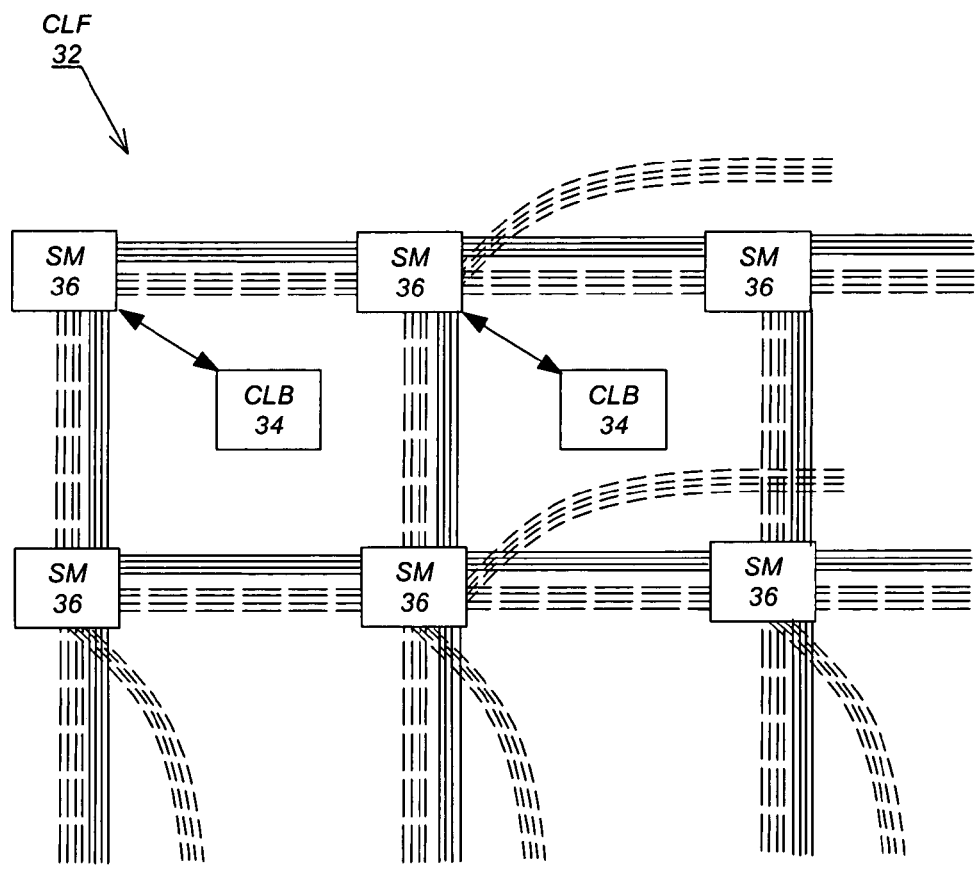
FIG. 3 is a block diagram that illustrates one possible embodiment for the configurable logic fabric according to the preferred embodiment of the present invention.

FIG. 3 is a block diagram that illustrates one possible embodiment for the CLF 32 according to the preferred embodiment of the present invention. The CLF 32 comprises an array of combinational logic blocks (CLBs) 34 surrounded by and connected to switch matrices (SMs) 36 for routing between CLBs 34. Each CLB 34 is connected to a single SM 36 to which all inputs and outputs of the CLB 34 are connected. Routing between CLBs 34 is handled using the SMs 36, which can route signals in one of four directions to an adjacent SM 36 (represented as solid lines) or to a SM 36 two rows apart vertically or two columns apart horizontally (represented as dashed lines).

Figure 4:
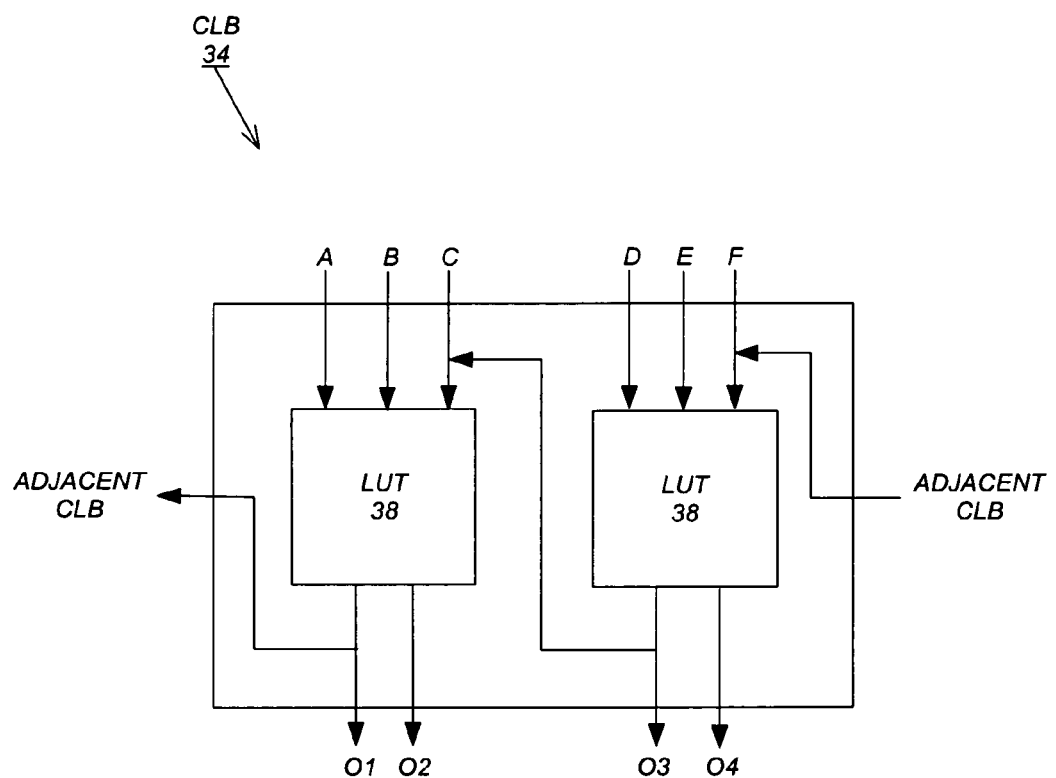
FIG. 4 is a block diagram that illustrates one possible embodiment for the combinational logic block according to the preferred embodiment of the present invention.

FIG. 4 is a block diagram that illustrates one possible embodiment for the CLB 34 according to the preferred embodiment of the present invention. Each CLB 34 is comprised of two 3-input 2-output Look-Up Tables (LUTs) 38, wherein a 3-bit address (ABC or DEF) generates a 2-bit output (O1/O2 or O3/O4) comprising the value stored at the indicated address. Additionally, the CLBs 34 are capable of supporting carry chains through direct connections, i.e., the ADJACENT CLB signal, between horizontally adjacent CLBs 34 and within the CLBs 34 through internal connections between adjacent LUTs 38, i.e., O3 to C. In both instances, the signal comprises the least-significant bit of the 3-bit address.

Figure 5:
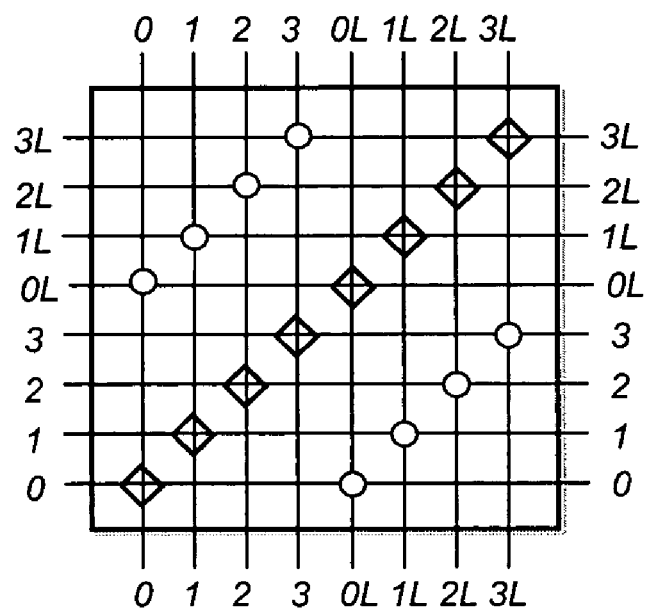
FIG. 5 is a block diagram that illustrates one possible embodiment for the switch matrix according to the preferred embodiment of the present invention.

FIG. 5 is a block diagram that illustrates one possible embodiment for the SM 36 according to the preferred embodiment of the present invention. Each SM 36 is connected using eight channels on each side of the SM 36, four short channels (0,1,2,3) routing between adjacent nodes and four long channels (0L,1L,2L,3L) routing between every other SM 36. Routing through the SM 36 can only connect a wire from one side with a given channel to another wire on the same channel but a different side of the SM 36. Additionally, each of the four short channels is paired with a long channel and can be connected together within the SM 36 (indicated as a circle where two channels intersect) allowing wires to be routed using short and long connections. Designing the SM 36 in this manner simplifies the routing algorithm by only allowing the router to route a wire using a single pair of channels throughout the CLF 32.

Figure 6:
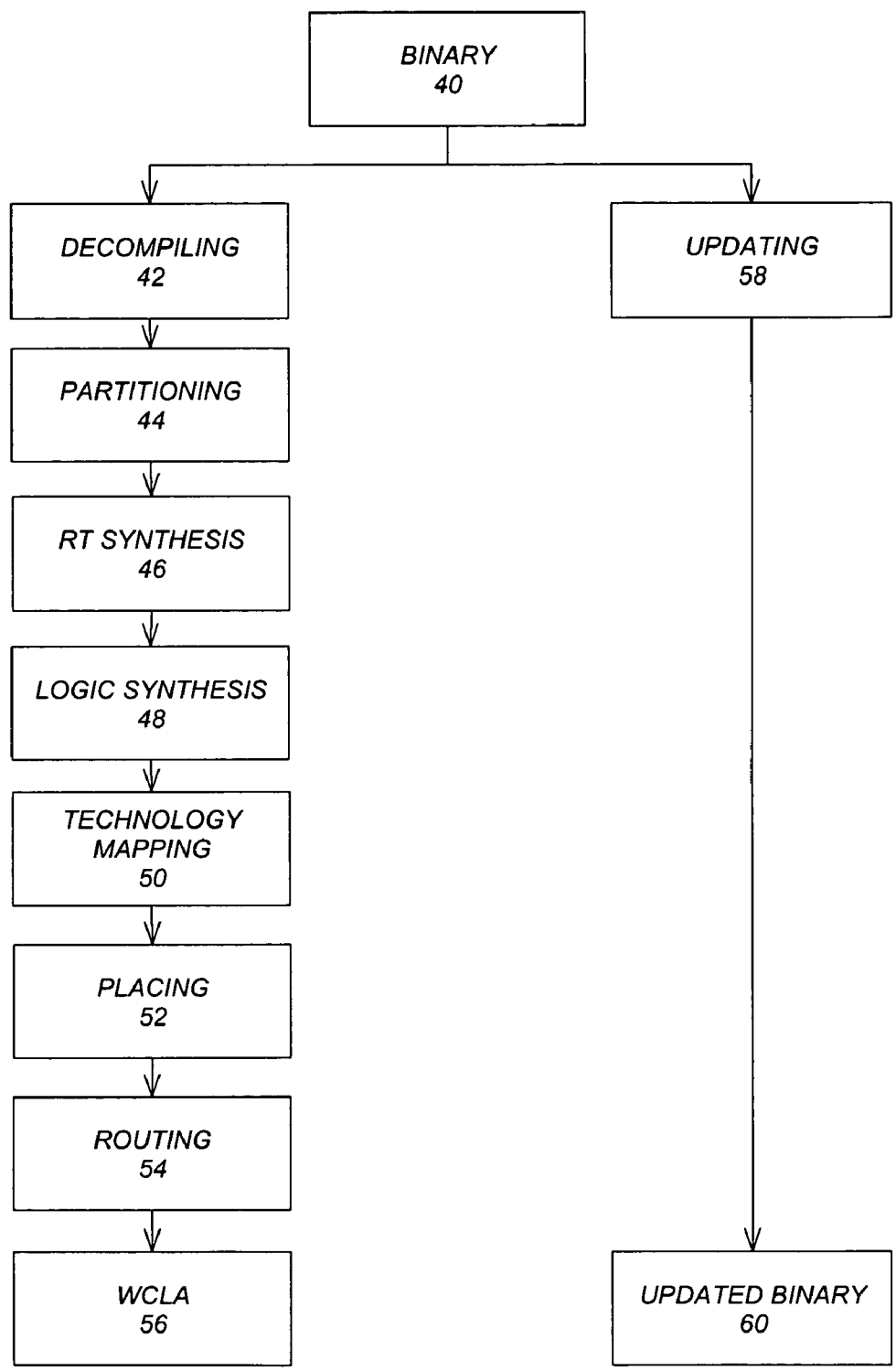
FIG. 6 is a flowchart that illustrates the one possible embodiment for the steps or logic performed by the dynamic partitioning module according to the preferred embodiment of the present invention.

FIG. 6 is a flowchart that illustrates the one possible embodiment for the steps or logic performed by the dynamic partitioning module 22 according to the preferred embodiment of the present invention.

Block 40 represents the binary 24 of the software application that is executed by the microprocessor 12, before the binary 24 has been partitioned and updated.

Block 42 represents decompiling the binary 24 into a high-level representation more suitable for synthesis. The decompiling step first converts each instruction of the binary 24 into equivalent register transfers, which provides an instruction-set independent representation. Once the instructions have been converted to register transfers, the decompiling step builds a control flow graph for the code regions, and then constructs a data flow graph by parsing the semantic strings for each register transfer. A parser function builds trees for each register transfer and then combines the trees into a full data flow graph through definition-use and use-definition analysis. After creating the control and data flow graphs, compiler optimizations are applied to remove any overhead introduced by the original compilation and instruction set.

Block 44 represents partitioning the critical code regions of the binary 24 identified by the profiler 20 to evaluate which of the code regions are most suitable for implementation in the warp configurable logic architecture 14. Using a partitioning heuristic, the partitioning step determines which critical code regions should be implemented in the warp configurable logic architecture 14 to maximize speedup while reducing energy.

Finally, the dynamic partitioning module 22 performs a JIT compilation to generate an implementation or configuration for the warp configurable logic architecture 14 from the critical code regions. The JIT compilation is represented by Blocks 46-54 in FIG. 6.

Block 46 represents performing a register-transfer (RT) synthesis to convert the critical code regions into a Boolean expression for every output bit within the configurable logic fabric 32 by traversing the dataflow graphs of the critical code regions. The result of this synthesis is a Boolean logic network.

Block 48 represents performing a logic synthesis to create a directed acyclic graph (DAG) of the Boolean logic network, starting with the Boolean equations. The internal nodes of the DAG correspond to simple logic gates, namely AND, OR, XOR, and invert (NOT). The logic synthesis step then optimizes the Boolean logic network using a two-level logic minimizer. Starting with the input nodes, the logic minimizer traverses the Boolean logic network in a breadth first manner and applies logic minimization at each node. Then, the logic minimizer uses a single expand phase to achieve good optimization. While a more complex two-level logic minimizer could achieve better optimization for larger examples, this simplified logic minimizer is better suited for on-chip execution.

After logic synthesis, Block 50 represents technology mapping the DAG to create the CLBs 34. This step traverses the DAG backwards starting with the output nodes and combines nodes to create LUT 38 nodes corresponding with 3-input single-output LUTs 38. Once the single-output LUT 38 nodes are identified, the nodes are further combined wherever possible to form the final 3-input 2-output LUTs 38, which are a direct mapping to the underlying CLF 32. The LUTs 38 are then packed together into CLBs 34 by identifying situation in which routing resources between adjacent LUTs 38 can be utilized, such as when the output from one LUT 38 is an input to another LUT 38.

Block 52 represents placing the CLBs 34 onto the CLF 32. Placement of the CLBs 34 is performed in two parts. The first part determines a relative placement of the CLB 34 nodes to each other, by determining the critical path and placing this path into a single horizontal row. The remaining non-placed CLB 34 nodes are then analyzed to determine the dependency between the non-placed CLB 34 nodes and the CLB 34 nodes already placed. Based upon these dependencies, each CLB 34 node is placed either above (as an input to the placed CLB 34 node) or below (to use the output from placed CLB 34 nodes) as close as possible to the dependent node. Once the relative placement of the CLB 34 nodes has been determined, this placement is superimposed onto the center of the CLF 32.

Block 54 represents routing between inputs, outputs, and CLBs 34 within the CLF 32 using an on-chip router (OCR) function in order to generate an implementation or configuration for the warp configurable logic architecture 14. The on-chip router function starts by initializing the routing costs within a routing resource graph representing the CLF 32. For all un-routed nets, the on-chip router function uses a greedy routing process to route the net. During the greedy routing process, for each sink within the net, a route is determined between the un-routed sink and the net's source or the nearest routed sink. At each step, the on-chip router function is restricted to only choosing paths within a bounding box of the current sink and the chosen location to which the on-chip router function is routing. After all nets are routed, if illegal routes exist, which are the result of overusing routing channels, then the on-chip router function eliminates only the illegal routes and adjusts the routing costs of the entire routing resource graph. While the same routing cost model is used as the routability-driven router of the well known Versatile Place and Route (VPR) tool suite, the on-chip router function also incorporates an adjustment cost. During the process of eliminating illegal routes, a small routing adjustment cost is added to all routing resources used by an illegal route. During the routing process, an early routing decision can force the on-chip router function algorithm to choose a congested path. Hence, the routing adjustment cost discourages the greedy on-chip router function from selecting the same initial routing and enables the on-chip router function to attempt a different routing path in subsequent routing iterations. Once a valid global routing has been determined, the on-chip router function performs detailed routing in which the channels used for each route are assigned. The detailed routing starts by constructing a routing conflict graph. Two routes conflict when both routes pass through a given SM 36 and assigning the same channel for both routes would result in an illegal routing within the SM 36. The on-chip router function assigns the routing channels by determining a vertex coloring of the routing conflict graph. While many approaches for vertex coloring exists, Brelaz's vertex coloring algorithms were chosen for use in the preferred embodiment. Brelaz's algorithm is a simple greedy algorithm that produces good results while not increasing the overall memory consumption of the on-chip router function. If legal channel assignments cannot be assigned for all routes, for those routes that a valid channel assignment cannot be found, the on-chip router function eliminates the illegal routes, adjusts the routing costs of all nodes along the illegal route (as described above), and reroutes the illegal routes. The on-chip router function finishes routing a circuit when a valid routing path and channel assignment has been determined for all nets.

Block 56 represents the warp configurable logic architecture 14 after the implementation or configuration has been completed and loaded into the warp configurable logic architecture 14.

Block 58 represents updating the binary 24 to access and invoke the warp configurable logic architecture 14 where necessary. The original instructions in the binary 24 for the critical code regions are replaced with a "jump" instruction to a set of instructions for the warp configurable logic architecture 14. The set of instructions first enables the warp configurable logic architecture 14 by writing to a memory mapped register or port that asserts an enable signal to the warp configurable logic architecture 14. The set of instructions then suspends the microprocessor 12 by invoking a power-down sleep mode. When the warp configurable logic architecture 14 finishes performing its functions, the warp configurable logic architecture 14 asserts a completion signal to the microprocessor 12 that results in an interrupt. The interrupt "wakes up" the microprocessor 12, which resumes normal execution of the binary 24 at the end of the set of instructions for the warp configurable logic architecture 14, which comprises a "jump" instruction back to the original instructions in the binary 24.

Block 60 represents the binary 24 after the update has been completed.

Loop Rerolling

An important step during decompilation is loop rerolling, wherein loops that were unrolled by a compiler are identified and then rerolled into a generalized loop body. Loop rerolling is necessary for accurate profiling and for efficient synthesis. The profiler 20 in the warp processor 10 identifies loops by detecting branch instructions with a small backwards target. Unrolled loops eliminate these branch instructions, resulting in inaccurate profiling. In addition, unrolled loops are decompiled into a large control/data flow graph. Synthesis from this larger graph requires long execution times and increased memory resources, both of which are not available in warp processors 10. Loop rerolling reduces the size of the graph, resulting in efficient synthesis.

Figure 7:
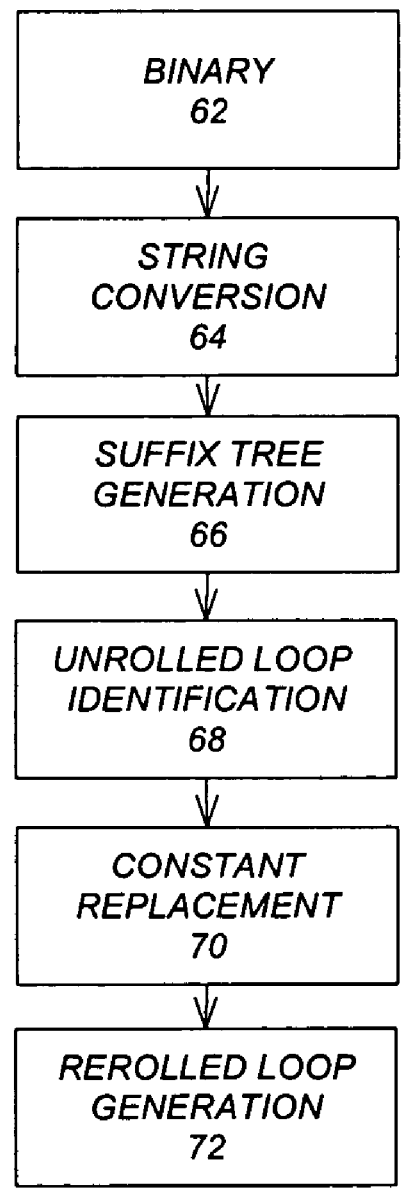
FIG. 7 is a flowchart that illustrates the one possible embodiment for the steps or logic performed by the loop rerolling during decompilation according to the preferred embodiment of the present invention.

FIG. 7 is a flowchart that illustrates the one possible embodiment for the steps or logic performed by the loop rerolling during decompilation according to the preferred embodiment of the present invention.

Block 62 represents the binary 24 of the software application that is executed by the microprocessor 12, before the binary 24 has been partitioned and updated.

Block 64 represents string conversion, which converts each function in the binary 24 into a string representation by mapping each individual instruction to a character from an alphabet the size of the instruction set. After converting a function to a string representation, identifying an unrolled loop is equivalent to finding repeated substrings that occur consecutively in the string.

Block 66 represents suffix tree generation, which creates a suffix tree representation of each function in the binary. Each internal node of the suffix tree represents a substring that repeats somewhere in the original string.

Block 68 represents unrolled loop identification, which utilizes the suffix trees to efficiently identify consecutive, repeating substrings by finding adjacent internal nodes of the suffix tree that represent the same substring.

Block 70 represents constant replacement, which analyzes the constants in each unrolled iteration of the loop and replaces the constants with an equivalent function that defines the constant value based on the current loop iteration.

Block 72 represents rerolled loop generation, which creates a compacted loop body that is semantically equivalent to each unrolled loop iteration.

Transparent Partitioning

The above steps allow transparent partitioning to be performed. Consider a scenario where a designer using a warp processor 10 does not directly create an application to take advantage of the warp processor 10. Instead, the designer programs the warp processor 10 as if only the underlying microprocessor 12 exists. This would entail using a traditional software design flow, comprised of a compiler, linker, processor simulator, etc., for the microprocessor 12. After testing the software to verify that it works correctly, the designer would load the application's binary 24 into the warp processor 10. Transparently, during execution of the binary 24, the warp processor 10 identifies the critical code regions of the binary 24, partitions the critical and non-critical code regions of the binary 24, and re-implements the critical code regions in the warp configurable logic architecture 14, resulting in better performance and lower energy consumption.

Moreover, the JIT compilation described above provides hardware portability. Consider the example of a TV set-top box. Cable TV companies often transparently upgrade the software within such boxes, by downloading a new binary 24 into the boxes. Generally, such upgrades work even with different microprocessors 12, such as older and newer versions of microprocessors 12 within the same family, because the newer versions of the microprocessors 12 generally still execute binaries 24 developed for the older versions of the microprocessors 12. Moreover, the present invention allows the use of different warp configurable logic architectures 14 with the same binary 24, because of the JIT compilation performed by the warp processors 10.

Possible Modifications and Variations

In most situations, the warp processors 10 will identify and re-implement critical code regions onto the warp configurable logic architectures 14, and the re-implementation will be permanent or semi-permanent. In alternative embodiments, the warp processor 10 could also be used to continually monitor the execution of the binary 24 by the microprocessor 12 to determine if different critical code regions develop over time, e.g., based on the particular environment in which the warp processor 102 is being used. If so, the warp processor 10 could then re-partition the binary 24 and re-implement the newly identified critical code regions to the warp configurable logic architecture 14.

Furthermore, a warp processor 10 can also implement multiple critical code regions within the warp configurable logic architecture 14. One approach is to directly map multiple critical code regions to the warp configurable logic architecture 14 simultaneously, thereby allowing multiple implementations to coexist within the warp configurable logic architecture 14. Alternatively, the warp processor 10 could cache individual implementations for multiple critical code regions and dynamically reconfigure the warp configurable logic architecture 14 when each implementation is required.

A warp processor 10 can also used for fast system design exploration during a traditional hardware/software partitioning approach. During traditional hardware/software partitioning, an automated approach must analyze various possible partitioning schemes to determine which partitioning scheme results in the best overall implementation, in terms of performance, energy consumption, or both. Such approaches often rely on extremely slow simulations that often can only simulate a few seconds of actual application behavior. Alternatively, by incorporating an exploration tool with the warp processor 10, the exploration tool could use the warp processor 10 to attempt several different partitioning schemes to determine which scheme results in the best performance and/or energy consumption. Automated partitioning tools can then use these results to restrict the partitioning to the best potential partitioning scheme identified by the warp processor 10, while still relying on powerful desktop CAD tools to provide very efficient implementations.

Experimental Results

Figure 8A:
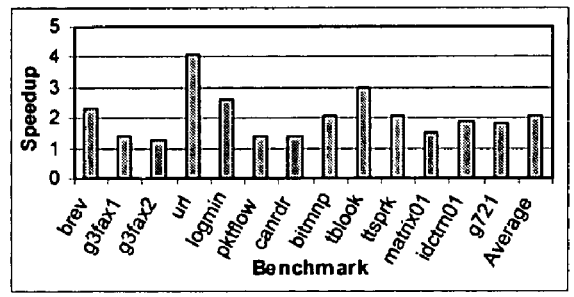
FIGS. 8a and 8b are graphs that highlight the speedup and energy reduction of warp processors.
Figure 8B:
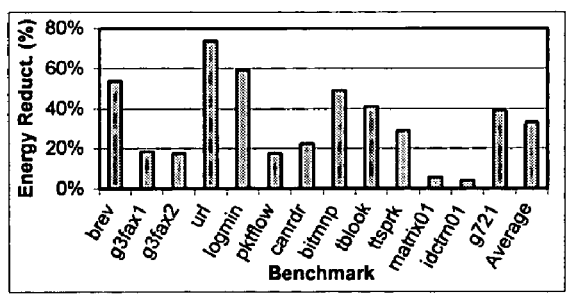

FIGS. 8a and 8b are graphs that highlight the speedup and energy reduction of warp processors 10. Although a simple warp configurable logic architecture 14 is used, warp processors 10 achieve good increases in performance with an average speedup of 2.1. Warp processors 10 can also greatly reduce the energy consumption of embedded applications by an average of 31%, and for some applications, warp processors 10 can reduce energy consumption by over 75%. The performance and energy improvements of warp processors 10 are extremely close to traditional hardware/software partitioning approaches when only considering the partitioning of the single most critical code region.

However, warp processors 10 have many advantages over traditional hardware/software partitioning. The dynamic partitioning of the present invention is completely transparent, meaning a designer can achieve the benefits of traditional partitioning while creating a software application using standard software tools and flows. Moreover, the dynamic partitioning of the present invention can also adapt to an application's actual usage at run-time, which is extremely difficult to determine statically, as simulations are several orders of magnitude slower than executing an application natively on a processor.

REFERENCES

The following references are incorporated by reference herein:

1. G. Stitt, R. Lysecky, F. Vahid. Dynamic Hardware/Software Partitioning: A First Approach. IEEE/ACM 40th Design Automation Conference (DAC), June 2003.

2. R. Lysecky, F. Vahid. A Configurable Logic Fabric for Dynamic Hardware/Software Partitioning. IEEE/ACM Design Automation and Test in Europe Conference (DATE), February 2004.

3. R. Lysecky, F. Vahid. Dynamic FPGA Routing for Just-in-Time FPGA Compilation. Submitted to Design Automation Conference, November 2003.

4. G. Stitt and F. Vahid. The Energy Advantages of Microprocessor Platforms with On-Chip Configurable Logic. IEEE Design and Test of Computers, November/December 2002, pp. 36-43.

5. G. Stitt and F. Vahid. Hardware/software Partitioning of Software Binaries. IEEE/ACM International Conference on Computer Aided Design, November 2002, pp. 164-170.

6. G. Stitt, B. Grattan, J. Villarreal and F. Vahid. Using On-Chip Configurable Logic to Reduce Embedded System Software Energy. IEEE Symposium on Field-Programmable Custom Computing Machines, Napa Valley, April 2002, pp. 143-151.

7. F. Vahid, R. Lysecky, C. Zhang and G. Stitt. Highly Configurable Platforms for Embedded Computing Systems. Microelectronics Journal, Elsevier Publishers, Volume 34, Issue 11, November 2003, Pages 1025-1029.

8. C. Zhang, F. Vahid and R. Lysecky. A Self-Tuning Cache Architecture for Embedded Systems. Design Automation and Test in Europe Conference (DATE), February 2004.

9. C. Zhang, F. Vahid, J. Yang, W. Najjar. A Way-Halting Cache for Low-Energy High-Performance Systems. IEEE Computer Architecture Letters, Vol. 2, September 2003.

10. C. Zhang, F. Vahid and W. Najjar. A Highly-Configurable Cache Architecture for Embedded Systems. International Symposium on Computer Architecture, 2003, pp. 136-146.

11. V. Bala, E. Duesterwald, S. Banerjia. Dynamo: A Transparent Dynamic Optimization System. Proc. of the ACM SIGPLAN '00 Conference on Programming Language Design and Implementation, pp. 1-12, 2000.

12. M. Gschwind, E. Altman, S. Sathaye, P. Ledak, D. Appenzeller. Dynamic and Transparent Binary Translation. IEEE Computer Magazine Vol. 33 No. 3. pp. 54-59, March 2000.

13. Klaiber. The Technology Behind Crusoe Processors. Transmeta Corporation White Paper, January 2000.

14. Smit, G., P. Havinga, L. Smit, P. Heysters, M. Rosien. Dynamic Reconfiguration in Mobile Systems. Proc. FPL, 2002.

15. Hounsell and R. Taylor, Critical Blue Ltd., UK, Co-Processor Synthesis: A New Methodology For Embedded Software Acceleration, IEEE/ACM Design Automation and Test in Europe Conference (DATE), February 2004.

16. R. Goering, C design goes 'soft'. EE Times, http://www.eetimes.com/story/OEG20010423S0032, Apr. 23, 2001

17. R. Lysecky, F. Vahid. On-Chip Logic Minimization. IEEE/ACM 40th Design Automation Conference (DAC), June 2003.

18. R. Lysecky and F. Vahid. A Co-designed On-Chip Logic Minimizer. ACM/IEEE ISSS/CODES conference, 2003.

19. C. Cifuentes. Structuring Decompiled Graphs. In Proceedings of the International Conference on Compiler Construction, volume 1060 of Lecture Notes in Computer Science, pg. 91-105. April 1996.

20. C. Cifuentes, D. Simon, A. Fraboulet. Assembly to High-Level Language Translation. Department of Computer Science and Electrical Engineering, University of Queensland. Technical Report 439, August 1998.

21. C. Cifuentes, M. Van Emmerik, D. Ung, D. Simon, T. Waddington. Preliminary Experiences with the Use of the UQBT Binary Translation Framework. Proceedings of the Workshop on Binary Translation, Newport Beach, USA, October 1999.

CONCLUSION

This concludes the description of the preferred embodiment of the present invention. The following describes some alternative embodiments for accomplishing the present invention.

For example, although the warp configurable logic architecture is described as using FPGAs and DPGAs, any dynamically configurable logic device could be used. Variations in the components used in the warp processor are possible, including different processors, profilers, dynamic partitioning modules.

Further, the specific logic or steps performed by the warp processor, and especially the profiler and dynamic partitioning module, are presented for illustration purposes only, and other logic or steps could be used as well. Many variations of the logic and steps performed by the warp processor are possible.

Moreover, variations in the compilation of the implementation or configuration of the configurable logic are possible without departing from the scope of the present invention.

In addition, although the profiler and dynamic partitioning module (which performs profiling, decompilation, synthesis, placement and routing) are described as being implemented in separate processors in the preferred embodiment, both could be implemented as a separate task or the same task on the same microprocessor that executes the application. Also, both the profiler and dynamic partitioning module could be implemented on separate systems from the microprocessor, such as workstations and the like.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for hardware/software partitioning, comprising:
   (a) executing an application's binary in a warp processor having dynamically configurable logic associated therewith;
   (b) executing a profiler for monitoring the executing binary in the warp processor to identify relative execution frequencies of the binary's code regions in order to identify one or more critical and non-critical code regions in the binary;
   (c) executing a dynamic partitioning module for dynamically partitioning the executing binary between the critical and non-critical code regions for re-implementing the critical code regions in the dynamically configurable logic during execution of the binary in the warp processor, and for updating the executing binary in the warp processor to access the dynamically configurable logic rather than the critical code regions.

2. The method of claim 1, wherein the dynamic partitioning step comprises:
   decompiling the binary into a high-level representation;
   analyzing the high-level representation to identify which of the critical code regions should be implemented in the dynamically configurable logic; and
   compiling the identified critical code regions to create a configuration for the dynamically configurable logic.

3. The method of claim 2, wherein the decompiling step comprises loop rerolling, wherein loops that were unrolled by a compiler are identified and then rerolled into a generalized loop body.

4. The method of claim 2, wherein the compiling step comprises:
   performing a register-transfer (RT) synthesis to convert the identified critical code regions into a Boolean logic network;
   performing a logic synthesis to create a directed acyclic graph (DAG) of the Boolean logic network;
   mapping the directed acyclic graph to create combinational logic block (CLB) nodes;
   placing the combinational logic block nodes onto the configurable logic;
   routing between inputs, outputs, and combinational logic block nodes within the configurable logic in order to generate the configuration for the dynamically configurable logic.

5. The method of claim 2, wherein the warp processor performs Just-in-Time (JIT) compilation for any of a plurality of different dynamically configurable logic devices.

6. The method of claim 1, wherein the binary, profiler and dynamic partitioning module are all executed by a single processor.

7. The method of claim 1, wherein the binary, profiler and dynamic partitioning module are all executed separately by different processors.

8. An apparatus for hardware/software partitioning, comprising:
   (a) a warp processor having dynamically configurable logic associated therewith, wherein an application's binary is executed in the processor;
   (b) a profiler for monitoring the executing binary in the warp processor to identify relative execution frequencies of the binary's code regions in order to identify one or more critical and non-critical code regions in the binary; and
   (c) a dynamic partitioning module for dynamically partitioning the executing binary between the critical and non-critical code regions, for re-implementing the critical code regions in the dynamically configurable logic during execution of the binary in the warp processor, and for updating to executing binary in the warp processor to access the dynamically configurable logic rather than the critical code regions.

9. The apparatus of claim 8, wherein the dynamic partitioning module decompiles the binary into a high-level representation, analyzes the high-level representation to identify which of the critical code regions should be implemented in the dynamically configurable logic, and compiles the identified critical code regions to create a configuration for the dynamically configurable logic.

10. The apparatus of claim 9, wherein the decompilation comprises loop rerolling, wherein loops that were unrolled by a compiler are identified and then rerolled into a generalized loop body.

11. The apparatus of claim 9, wherein the dynamic partitioning module compiles the identified critical code regions by performing a register-transfer (RT) synthesis to convert the identified critical code regions into a Boolean logic network, performing a logic synthesis to create a directed acyclic graph (DAG) of the Boolean logic network, mapping the directed acyclic to create combinational logic block (CLB) nodes, placing the combinational logic block nodes onto the configurable logic, and routing between inputs, outputs, and combinational logic block nodes within the dynamically configurable logic in order to generate the configuration for the dynamically configurable logic.

12. The apparatus of claim 9, wherein the warp processor performs Just-in-Time (JIT) compilation for any of a plurality of different dynamically configurable logic devices.

13. The apparatus of claim 8, wherein the binary, profiler and dynamic partitioning module are all executed by a single processor.

14. The apparatus of claim 8, wherein the binary, profiler and dynamic partitioning module are all executed separately by different processors.

15. An apparatus for hardware/software partitioning, comprising:
  (a) means for executing an application's binary in a warp processor having dynamically configurable logic associated therewith;
  (b) means for monitoring the executing binary in the warp processor to identify relative execution frequencies of the binary's code regions in order to identify one or more critical and non-critical code regions in the executing binary;
  (c) means for dynamically partitioning the executing binary between the critical and non-critical code regions, for re-implementing the critical code regions in the dynamically configurable logic during execution of the binary in the warp processor, and for updating the executing binary in the warp processor to access the dynamically configurable logic rather than the critical code regions.

16. The apparatus of claim 15, wherein the means for dynamically partitioning comprises:
  means for decompiling the binary into a high-level representation;
  means for analyzing the high-level representation to identify which of the critical code regions should be implemented in the dynamically configurable logic; and
  means for compiling the identified critical code regions to create a configuration for the dynamically configurable logic.

17. The apparatus of claim 16, wherein the means for decompiling comprises means for loop rerolling, wherein loops that were unrolled by a compiler are identified and then rerolled into a generalized loop body.

18. The apparatus of claim 16, wherein the means for compiling comprises:
  means for performing a register-transfer (RT) synthesis to convert the identified critical code regions into a Boolean logic network;
  means for performing a logic synthesis to create a directed acyclic graph (DAG) of the Boolean logic network;
  means for mapping the directed acyclic graph to create combinational logic block (CLB) nodes;
  means for placing the combinational logic block nodes onto the dynamically configurable logic; and
  means for routing between inputs, outputs, and combinational logic block nodes within the dynamically configurable logic in order to generate the configuration for the dynamically configurable logic.

19. The apparatus of claim 16, wherein the warp processor performs Just-in-Time (JIT) compilation for any of a plurality of different dynamically configurable logic devices.

20. The apparatus of claim 15, wherein the binary, means for monitoring and means for dynamically partitioning are all executed by a single processor.

21. The apparatus of claim 15, wherein the binary, means for monitoring and means for dynamically partitioning are all executed separately by different processors.

22. A method for implementing a configuration in dynamically configurable logic, comprising:
  executing an application's binary in a warp processor having dynamically configurable logic associated therewith, while simultaneously performing a dynamic hardware/software partitioning of the executing binary in the warp processor, wherein the dynamic hardware/software partitioning comprises:
  decompiling the executing binary into a high-level representation;
  analyzing the high-level representation to identify which code regions of the executing binary should be implemented in the dynamically configurable logic;
  compiling the identified code regions to create a configuration for the dynamically configurable logic, wherein the compiling step comprises:
    performing a register-transfer (RT) synthesis to convert the identified code regions into a Boolean logic network;
    performing a logic synthesis to create a directed acyclic graph (DAG) of the Boolean logic network;
    mapping the directed acyclic graph to create combinational logic block (CLB) nodes;
    placing the combinational logic block nodes onto the dynamically configurable logic; and
    routing between inputs, outputs, and combinational logic block nodes within the dynamically configurable logic in order to generate the configuration for the dynamically configurable logic.

23. The method of claim 22, wherein the identified code regions comprise all the code regions of the application's binary.

24. The method of claim 22, wherein the identified code regions comprise only a portion of the code regions of the application's binary.

25. An apparatus for implementing a configuration in dynamically configurable logic, comprising:
  a warp processor having dynamically configurable logic associated therewith;
  logic, performed by the processor, for executing an application's binary in the warp processor, while simultaneously performing a dynamic hardware/software partitioning of the executing binary in the warp processor, wherein the dynamic hardware/software partitioning comprises:
    logic for decompiling the executing binary into a high-level representation;

logic for analyzing the high-level representation to identify which code regions of the executing binary should be implemented in the dynamically configurable logic;

logic for compiling the identified code regions to create a configuration for the dynamically configurable logic, wherein the logic for compiling comprises:

logic for performing a register-transfer (RT) synthesis to convert the identified code regions into a Boolean logic network;

logic for performing a logic synthesis to create a directed acyclic graph (DAG) of the Boolean logic network logic for mapping the directed acyclic graph to create combinational logic block (CLB) nodes;

logic for placing the combinational logic block nodes onto the dynamically configurable logic; and logic for routing between inputs, outputs, and combinational logic block nodes within the dynamically configurable logic in order to generate the configuration for the dynamically configurable logic.

26. The apparatus of claim 25, wherein the identified code regions comprise all the code regions of the application's binary.

27. The apparatus of claim 25, wherein the identified code regions comprise only a portion of the code regions of the application's binary.

28. An apparatus for implementing a configuration in dynamically configurable logic, comprising;

means for executing an application's binary in a warp processor having dynamically configurable logic associated therewith, while simultaneously performing a dynamic hardware/software partitioning of the executing binary in the warp processor, wherein the dynamic hardware/software partitioning comprises:

means for decompiling the executing binary into a high-level representation;

means for analyzing the high-level representation to identify which code regions of the executing binary should be implemented in the dynamically configurable logic;

means for compiling the identified code regions to create a configuration for the dynamically configurable logic, wherein the means for compiling comprises:

means for performing a register-transfer (RT) synthesis to convert the identified code regions into a Boolean logic network;

means for performing a logic synthesis to create a directed acyclic graph (DAG) of the Boolean logic network;

means for mapping the directed acyclic graph to create combinational logic block (CLB) nodes;

means for placing the combinational logic block nodes onto the dynamically configurable logic; and means for routing between inputs, outputs, and combinational logic block nodes within the dynamically configurable logic in order to generate the configuration for the dynamically configurable logic.

29. The apparatus of claim 28, wherein the identified code regions comprise all the code regions of the application's binary.

30. The apparatus of claim 28, wherein the identified code regions comprise only a portion of the code regions of the application's binary.

* * * * *

UNITED STATES PATENT AND TRADEMARK OFFICE
CERTIFICATE OF CORRECTION

| | | |
|---|---|---|
| PATENT NO. | : 7,356,672 B2 | Page 1 of 1 |
| APPLICATION NO. | : 10/856062 | |
| DATED | : April 8, 2008 | |
| INVENTOR(S) | : Vahid et al. | |

It is certified that error appears in the above-identified patent and that said Letters Patent is hereby corrected as shown below:

<u>Column 12</u>:

Claim 8, line 63, please delete "to" and insert --the--.

Signed and Sealed this

Second Day of November, 2010

David J. Kappos
*Director of the United States Patent and Trademark Office*